United States Patent [19]

Davis

[11] 3,922,694
[45] Nov. 25, 1975

[54] CARRYING STRAP ATTACHMENT FOR A PHOTOGRAPHIC CAMERA

[75] Inventor: Carl W. Davis, Lynnfield, Mass.

[73] Assignee: Polaroid Corporation, Cambridge, Mass.

[22] Filed: Jan. 2, 1974

[21] Appl. No.: 430,069

[52] U.S. Cl. .................. 354/82; 224/5 U; 354/354
[51] Int. Cl.² .................. A45C 11/38; G03B 17/02
[58] Field of Search ............ 354/354, 288, 82, 293; 224/5 U, 5 A, 5 H, 58, 55; 352/243

[56] References Cited
UNITED STATES PATENTS

| | | | |
|---|---|---|---|
| 2,638,041 | 5/1953 | Horydczak | 352/243 X |
| 2,889,095 | 6/1959 | Heidecke et al. | 224/5 U |
| 2,938,441 | 5/1960 | Klingenstein | 354/293 |
| 3,800,312 | 3/1974 | Brandt | 354/293 |

Primary Examiner—Samuel S. Matthews
Assistant Examiner—E. M. O'Connor
Attorney, Agent, or Firm—Kenneth W. Anderson

[57] ABSTRACT

A carrying strap attachment for a camera including couplers pivotally attached thereto to provide movement between a first operative position, in which the couplers engage opposite sides of a first movable section, and a second inoperative position in which the couplers are out of securing relation with the first movable section. The strap attachment may be detached from the camera by manually moving the couplers from the first to the second position or automatically detached by a cam action provided by engagement of the couplers with a second section of the camera when the camera is moved from an extended to a folded position. The couplers are connected by a resilient member operating to resiliently bias the couplers into the first position wherein the camera is securely transported in an extended operative position instantly available for use.

12 Claims, 7 Drawing Figures

CARRYING STRAP ATTACHMENT FOR A PHOTOGRAPHIC CAMERA

Cross Reference to Related Application

This application is related to application Ser. No. 430,070, filed Jan. 2, 1974 by John B. Morse, entitled A CARRYING STRAP ATTACHMENT FOR A PHOTOGRAPHIC CAMERA.

BACKGROUND OF THE INVENTION

1. Field of the Invention

This invention relates to a removable carrying strap attachment for use with a folding camera.

2. Description of the Prior Art

The use of a carrying strap for facilitating the transport of a photographic camera is known. Generally, the supporting straps are attached to eyes or loops which are mounted in a fixed position on opposite sides of the camera, near the top thereof. The camera is thereby equipped with a carrying strap which may encircle a shoulder or neck of a photographer.

Shoulder and neck straps provide a secure arrangement against accidental dropping and enable the photographer to transport the camera upon his person leaving both hands free for other purposes. Generally, the neck and shoulder straps attached to conventional cameras are not readily removable from the eyes or loops included on the camera and the photographer is often required to make repeated adjustments to the length of the straps to prevent an exasperating and distracting nuisance of dangling straps and swinging cameras which could be avoided if the straps could be conveniently removed from the camera.

Body harnesses have been developed for use with a variety of cameras and generally consist of a plurality of carrying straps encircling the waist and shoulders of the photographer. It has been found that prior art devices which form body harnesses are cumbersome and present a resistance to quick use thereby hindering free use of the camera. It is most desirable for the camera to be unrestrained and readily available to perform in order to obtain professional results.

Many cameras include in the base thereof a threaded bore for use in conjunction with a tripod adapted to be screwed therein. Rigid and flexible handles have been developed including a threaded member adapted to be screwed into the bore whereby a camera including the bore is attached thereto and carried. Generally, the photographer places a hand about the handle and holds the camera in an upright ready position or downward beside his body. To some extent, a grip must be maintained on the handle as long as the carrier transports the camera. However, inadvertent relaxation of the grip may cause the dropping of the camera with resulting damage thereto.

Alternatively wrist and loop straps similarly adapted to be screwed into the bore have been developed whereby the strap is placed around the wrist of the carrier to secure the camera against accidental dropping. Known supporting devices of this type do not always ensure satisfactory protection against damage as the wrist or loop strap is free to rotate about the hand of the carrier and may thereby unscrew and disengage the threaded member from within the threaded bore permitting the camera to fall and be damaged.

Although pockets and belt devices for holding cameras have been suggested for transporting the camera, a time consuming requirement of placing the camera into a sheath, after each photograph, is unduly restricting to professional and amateur photographers. The photographer prefers that the camera be readily available and reattachable to a carrying attachment without undue thought or activity.

The foregoing conventional strap arrangements may be satisfactory for some types of cameras but not for all. The conventional strap arrangements may be particularly unsatisfactory for folding cameras, especially those having a smaller form, such as "pocket cameras," which are generally of the folding type. Due to the compactness and lightweight characteristics of the "pocket cameras," carrying straps or provisions for attachment of carrying straps thereto are not generally included. Although compact and light in weight, a grip must be maintained upon the camera if the camera is transported in the extended position.

A relatively new type of compact folding camera having an elaborate precision construction formed by a plurality of interconnected housing sections coupled for movement between a folded inoperative position and an extended operative position, and others, having some but not necessarily all of these features, are of the relatively lightweight and compact variety. The camera is generally transported in the folded position in a coat pocket or in a handbag. As illustrative of such a folding camera mention may be made of U.S. Pat. No. 3,722,389. To permanently attach a conventional strap arrangement to the camera would defeat the purpose of developing a compact, lightweight design, although it would be desirable to have such a camera equipped to be transported in the extended operative position prepared to take advantage of a situation existing at any moment.

From the foregoing it can be seen that there is a need for a removable carrying strap attachment which may be securely attached to a camera, particularly a folding camera when in the extended, operative position, readily available for any eventualities the photographer may wish to record and is attachable and detachable without undue thought or activity.

SUMMARY OF THE INVENTION

The present invention is addressed to a detachable carrying strap attachment adapted for use with a folding camera in its extended operative position wherein the camera is quickly and readily available for recording a situation existing at any moment. The carrying strap attachment enables a photographer to transport the camera with both hands free for other purposes and provides for secure coupling of the strap attachment to the camera without requiring any structural changes to be made on the camera. The strap attachment is secured to the camera by couplers included thereon which are mounted for movement between a first operative position, wherein the couplers engage opposite sides of the camera, and a second inoperative position wherein the couplers are out of securing relation with the sides of the camera. Movement of the couplers from the first to the second position may be performed manually by the photographer or automatically by a cam action upon moving the camera from the extended to the folded position. When the couplers are moved into the second inoperative position, the camera is free to close uninterruptedly thereby preventing strain or damage to the camera during movement from the extended to the folded position. Therefore, the camera is protected automatically by the movement of the couplers into the second inoperative position should the photographer forget to detach the strap attachment before moving the camera into the folded position.

In a preferred embodiment, the carrying strap attachment is secured to a camera formed by a plurality of interconnected housing sections including first and second housing sections coupled for movement between folded and extended positions. The strap attachment may be positioned upon the first housing section of the camera when the camera is in the folded or extended position thereby moving the couplers into the second inoperative position. If the camera is in the folded position when the strap attachment is positioned on the first housing section, the coupling means, urged by a resilient member operating to resiliently bias the coupling means into the first operative position, move into the first position and engage opposite underlying edges of the first housing section when the camera is moved towards the extended position. When the strap attachment is positioned upon an extended first section of the camera, the resilient member will move the coupling means into the first operating position once the opposite underlying edges of the first housing section are made available by pushing the couplers in the direction of the underlying edges whereby the strap attachment is snap fastened thereto.

Therefore, it is an object of the present invention to provide a detachable carrying strap attachment which permits a folding camera to be comfortably transported in the extended position instantly available for use, while at the same time securely protects the camera from damage by accidental dropping.

It is yet another object of the present invention to provide a carrying strap attachment for a camera which provides for detachment from the camera in order that the camera may be used freely and then reattached without undue thought or activity.

A further object of the present invention is to provide a carrying strap attachment for a folding camera which provides protection to the camera against damage from accidental dropping and thoughtless collapsing of the camera when in secured relation therewith.

Other objects of the invention will in part be obvious and will in part appear hereinafter.

The invention accordingly comprises the apparatus possessing the construction, combination of elements, and arrangement of parts which are exemplified in the following disclosure and the scope of the application which will be indicated in the claims.

BRIEF DESCRIPTION OF THE DRAWINGS

For a fuller understanding of the nature and objects of the invention, reference should be made to the following detailed description taken in conjunction with the accompanying drawings wherein.

DETAILED DESCRIPTION OF THE INVENTION

Figure 1:
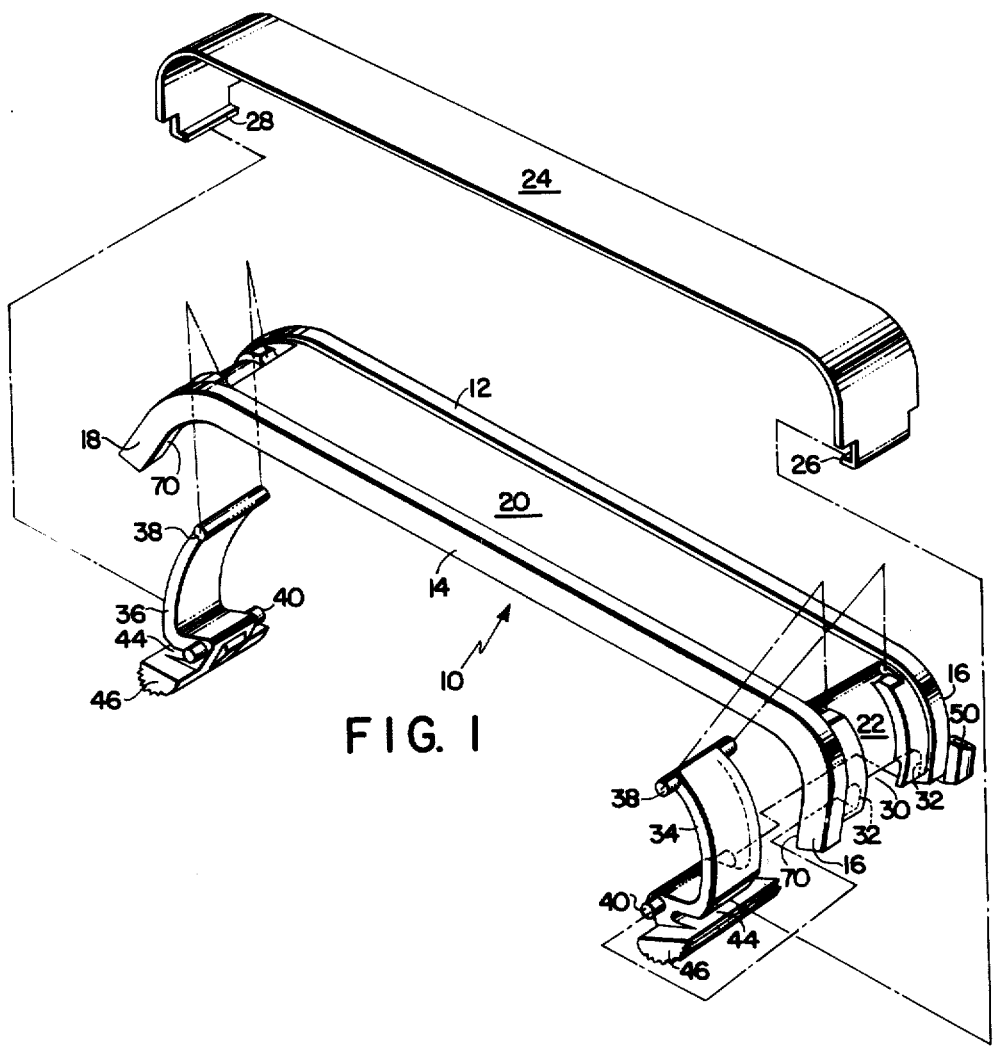
FIG. 1 is an exploded view of the instant invention with each member perspectively shown in its related position.

Referring in more detail by reference characters to FIG. 1, a carrying strap attachment 10 is illustrated comprising a plurality of interlocking members including a generally U-shaped support 12, having a first coupler 34 and a second coupler 36 pivotally connected thereto and a generally U-shaped resilient member 24 joined to the support 12 and in locking attachment to the first and second couplers 34 and 36. The support 12 includes a base 14 having a first upright 16 and a second upright 18 integrally attached to opposite ends of the base 14. A post 50 is provided on one edge of each unattached end of uprights 16 and 18 whreby one end of a supporting strap is secured to first upright 16 and another end to second upright 18 forming a loop for carrying the camera. The base 14 and first and second uprights 16 and 18 include a first recess 20 wherein the resilient member 24 is suitably received and positioned such that the resilient member 24 is seated within the first recess 20 flush with the upper surfaces of the support 12. The uprights 16 and 18 further include a second recess 22 configured to receive couplers 34 and 36 therein between the support 12 and resilient member 24. The second recess 22 is formed subjacent to the first recess 20 to provide clearance for the resilient member 24 to be seated within the first recess 20. First and second couplers 34 and 36 are pivotally positioned between first and second uprights 16 and 18 and resilient member 24 and locked therein by the resilient member 24 operating to resiliently bias the couplers 16 and 18 towards each other in a first operative position.

Couplers 34 and 36 are pivotally connected to uprights 16 and 18 by inserting each arcuate body of the couplers 34 and 36 into openings 30 included on each unattached end of uprights 16 and 18 and pivoting the couplers 34 and 36 about the unattached ends until the arcuate bodies and pivot members 38 are seated within second recess 22 in the first operative position. Once positioned within second recess 22, the couplers 34 and 36 are permitted to pivot away from each other about pivot member 38 to a maximum displacement position wherein latching member 40 of each coupler 34 and 36 is prevented from further movement when in contact with surfaces of cavities 32 provided within an inner side 70 of each upright 16 and 18 opposite to the second recess 22.

The resilient member 24 includes a first locking tab 26 and a second locking tab 28 configured to be received and retained in slots 44 included on couplers 34 and 36. The resilient member is attached by inserting the first or second locking tab 26 or 28 into its respective slot 44 and then placing the resilient member 24 in tension such that the unattached locking tab is in position to be snap fastened into its respective slot 44. Once the resilient member 24 is attached, the assembly is completed and the couplers 34 and 36 are latched to the support 12 in the first operative position by the resilient member 24 operating to resiliently bias the couplers 34 and 36 into the first operative position wherein the couplers 34 and 36 are in position to engage opposite sides of a camera.

The invention, having a carrying strap 54 attached, is shown coupled to a folding camera 60 in FIG. 2 through 7. A ring 52 is provided on each end of the carrying strap 54 for attachment into a bore included in each post 50 whereby the carrying strap 54 is joined to support 12.

Figure 2:
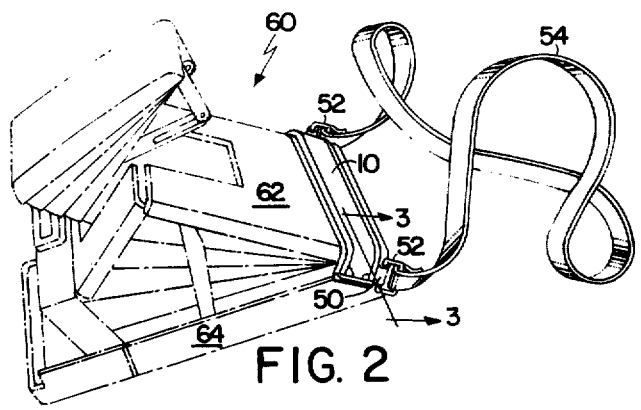
FIG. 2 is a perspective view of the carrying strap attachment secured to a folding camera shown in phantom lines latched in an extended operative position.
Figure 6:
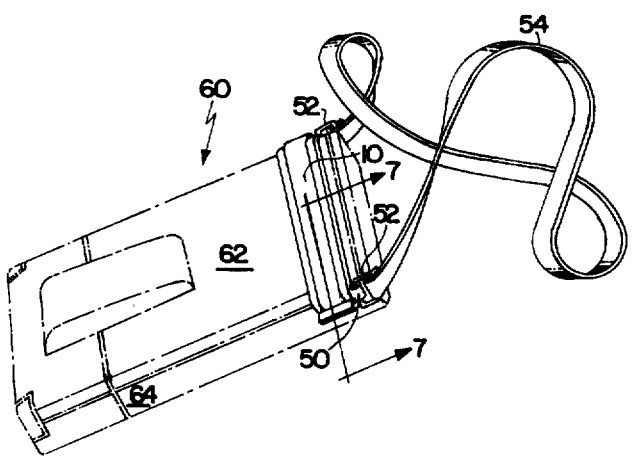
FIG. 6 is a perspective view of the carrying strap attachment secured to the folding camera shown in phantom lines in a folded inoperative position.
Figure 3:
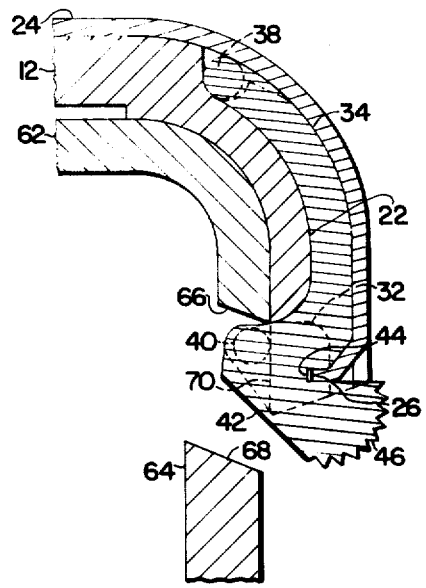
FIG. 3 is a partial, enlarged sectional view taken generally along the line 3—3 of FIG. 2.

The folding camera 60 is shown generally latched in its extended or operative position in FIGS. 2 and 3. Camera 60 includes a plurality of housing sections including a first housing section 62 and a second housing section 64 coupled for relative movement between the extended position shown in FIG. 2 and a folded position as shown in FIG. 6. The carrying strap attachment 10 is secured to the first housing section 62 by couplers 34 and 36 being in the first operative position wherein the couplers 34 and 36 are in firm engagement with opposite sides of the first housing section 62 as best shown in FIG. 3. The couplers 34 and 36 remain free to pivot about pivot member 38 within the second recess 22 and beneath the resilient member 24 operating to resiliently bias the couplers 34 and 36 towards each other into the first operative position. When the camera 60 is in the extended position, lower edge 66 of the first housing section 62 is displaced sufficiently from cam surface 68 of the second housing section 64 to enable a lower portion including latching member 40 of the couplers 34 and 36 to penetrate therein to a first location beneath edge 66 of the first housing section 62 thereby providing full support and protection for the camera 60 when the couplers 34 and 36 are in the first operative position.

Figure 4:
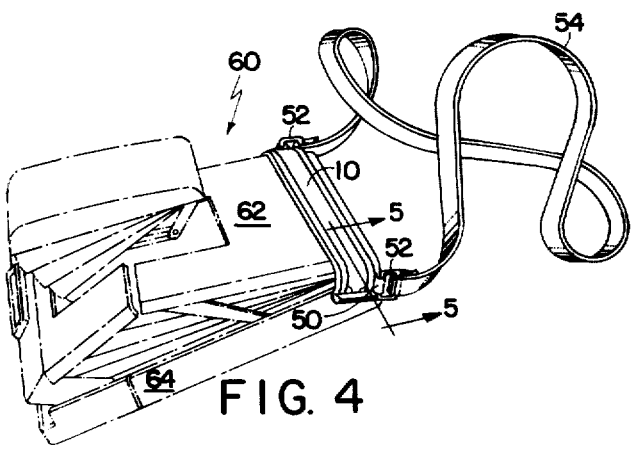
FIG. 4 is a perspective view of the carrying strap attachment secured to the folding camera shown in phantom lines in an intermediate position between the fully extended and a folded position.
Figure 5:
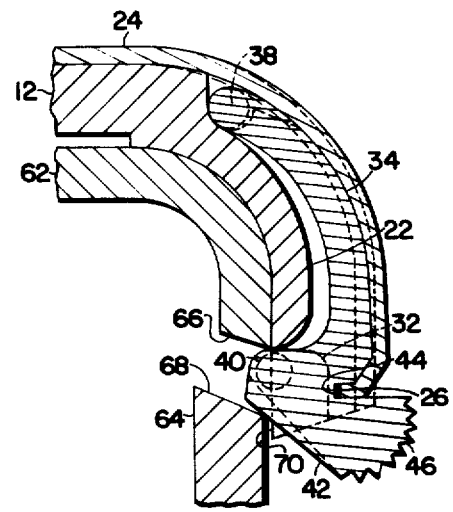
FIG. 5 is a partial, enlarged sectional view taken generally along the line 5—5 of FIG. 4.

The folding camera 60 is illustrated in FIGS. 4 and 5 in an intermediate, partially folded position wherein the relative movement of the first and second housing sections 62 and 64 is between the extended position and the folded position. The carrying strap attachment 10 is in an early stage of automatic detachment from the first housing section 62 as a result of the change in position of housing sections 62 and 64. When the camera 60 is moved from the extended towards the folded position, the separation between edge 66 of the first housing section and cam surface 68 of the second housing section is reduced. Couplers 34 and 36 remain in the first operative position in firm engagment with opposite sides of the first housing section 62 until contact is made between cam surface 68 of the second housing section 64 and cam surface 42 of the couplers 34 and 36 whereby the couplers are urged against the bias of member 24 away from the path of the moving first and second housing sections towards the second inoperative position.

Further movement of the first and second housing sections 62 and 64 towards the folded position forces the couplers 34 and 36 to pivot about pivot member 38 against the resilient biasing of the resilient member 24 whereby each end of the resilient member 24, joined by locking tabs 26 and 28 to couplers 34 and 36, is spread apart as the couplers 34 and 36 are cammed out of securing relation with the opposite sides of the first housing section 62.

Figure 7:
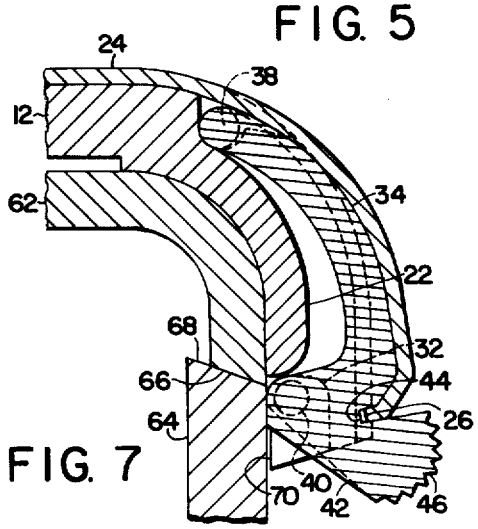
FIG. 7 is a partial, enlarged sectional view taken generally along the line 7—7 of FIG. 6.

The camera 60 is illustrated in FIGS. 6 and 7 in the folded position wherein the first and second housing sections 62 and 64 are substantially in contact with each other and neck strap attachment 10 is in position for removal from the camera 60. Couplers 34 and 36 are in the second inoperative position wherein the couplers 34 and 36 are out of securing relation with opposite sides of the first housing section 62. If the camera 60 should be re-opened to the extended position (as shown in FIG. 2), the couplers 34 and 36 will return to the first operating position in securing relation with opposite sides of the first housing section 62. Therefore, the carrying strap attachment 10 may be coupled to the folding camera when the camera 60 is in the folded or extended position without undue thought or activity.

The couplers 34 and 36 will pivot about pivot member 38 and push against resilient member 24 as a result of the cam action provided by the relative movement of the first and second housing sections 62 and 64 whereby lower edge 66 of the first housing section 62 applies pressure upon the couplers 34 and 36 and thereby cooperates with the cam surfaces 42 and 68 to overcome the resilient biasing of the resilient member 24 to force the couplers 34 and 36 to move away from each other spreading the attached ends of the resilient member 24. The couplers 34 and 36 will pivot a distance sufficient to cam the couplers 34 and 36 out of the path of the moving first and second housing sections 62 and 64 whereupon the first housing section 62 will be in closed contact with the second housing section 64 whereupon the couplers 62 and 64 will remain out of securing relation and in frictional engagement with opposite sides of the second housing section 64, as shown in FIG. 7.

The carrying strap attachment 10 is adapted for manual movement of the couplers 34 and 36 from the first operative position to the second inoperative position whereby the carrying strap attachment 10 may be detached from the camera 60. A knob 46 having knurled edges for firm gripping thereof is provided on each coupler 34 and 36. Finger pressure applied thereto in opposition to the resilient biasing of the resilient member 24 will move the couplers 34 and 36 into the second inoperative position. When the finger pressure is removed from the knob 46, the couplers 34 and 36 return to the first operative position due to the resilient member 24 operating to maintain the couplers 34 and 36 in the first operative position.

The latching member 40, responding to the pivotal movement of the couplers 34 and 36, moves from the first location beneath lower edge 66 and outside of the cavity 32, (as shown in FIG. 3) in the first operative position to a second location within the cavity 32 when the couplers 34 and 36 are in the second inoperative position (as shown in FIG. 7).

When the knobs 46 are employed for manual movement of the couplers 34 and 36 between the first and second positions, the latching member 40 prevents the couplers 34 and 36 from pivoting beyond a position wherein the carrying strap attachment 10 would disassemble leading to possible damage to the resilient member 24. Latching member 40 prevents such action from occurring by cooperating with the cavities 32 wherein the latching members 40 are prevented from further movement thereby interrupting the pivotal movement of the couplers 34 and 36 at a designated point.

It should be noted that carrying strap attachment 10 is not limited for use with folding cameras. If desired, the carrying strap attachment 10 may be adapted to comfortably transport non-folding cameras having a configuration such that the carrying strap attachment 10 may be joined thereto.

Due to the carrying strap attachment 10's construction, the distance between first and second uprights 16 and 18 and tabs 26 and 28 may be enlarged or reduced to accommodate any size camera or object therebetween and couplers 34 and 36 and resilient member 24 adapted to provide sufficient strength to securely support the camera or object.

From the foregoing, it is apparent that the carrying strap attachment 10 is comparable in cost to conventional carrying strap arrangements, durable, and is an easily assembled unit which provides for secure attachment to a folding camera whereby the camera may be transported in the extended, operative position satisfactorily protected against accidental dropping but may be disengaged manually or automatically in an instant for completely free use.

This invention may be practiced or embodied in still other ways without departing from the spirit and essential character thereof. The specific and preferred embodiments described herein are therefore to be considered illustrative and not restrictive, the scope of the invention being indicated by the appended claims and all variations which come within the meaning of the claims are intended to be embraced therein.

What is claimed is:

1. A carrying strap attachment for use with a folding camera having first and second housing sections mounted for relative movement between folded and extended positions, said attachment comprising: a support bar having opposing ends;
   means for securing a carrying strap to said support bar;
   means extending from said opposing ends of said support bar to form spaced inwardly facing opposing sides of said attachment for receiving the first housing section therebetween; and
   means coupled to each said extending means for movement thereon laterally towards said extending means into a first operative position wherein said coupling means are engageable with opposite sides of the first housing section for securing said support bar to the camera, and a second inoperative position wherein said coupling means are moved upon said extending means in a direction laterally away from said extending means and out of securing relation with the first housing section, said coupling means including means engageable by the second housing section during the relative movement of the housing sections towards the folded position for automatically moving said coupling means from said first position to said second position.

2. An attachment as defined in claim 1 further comprising:
   means for resiliently biasing said coupling means from said second position into said first position when the first and second housing sections are moved from the folded positions towards the extended position; and
   means on said biasing means for latching said biasing means to said coupling means thereby holding said biasing means to said coupling means during movment of said coupling means between said first and second positions.

3. An attachment as defined in claim 2 wherein said coupling means includes means for manually moving said coupling means from said first position to said second position.

4. An attachment as defined in claim 2 wherein said coupling means further includes means for receiving said latching means therein, said receiving means cooperating with said biasing means to secure said coupling means upon said extending means.

5. Photographic apparatus including a compact folding camera having first and second housing sections coupled for relative movement between folded and extended positions, and a carrying attachment for use in supporting said camera while in said extended position, comprising in combination: support means;
   means for securing a carrying strap to said support means;
   means coupled to said support means for movement between a first operative position, in which said coupling means engage underlying edges of opposite sides of said first housing section for securing said support means to said camera, and a second inoperative position, in which said coupling means are out of securing relation with said first housing section, said coupling means including cam means engageable by said second housing section during movement of said first and second housing sections towards said folded position for moving said coupling means from said first position to said second position.

6. The combination as defined in claim 5 further including means for resiliently biasing said coupling means from said second position into said first position when said first and second housing sections are moved from said folded position towards said extended position.

7. The combination as defined in claim 6 wherein said coupling means includes means for manually moving said coupling means from said first position to said second position.

8. The combination as defined in claim 6 further including means for latching said biasing means to said coupling means and wherein said coupling means further includes means for receiving said latching means therein, said receiving means cooperating with said biasing means to secure said coupling means upon said support means.

9. A carrying strap attachment for use with a camera, said attachment comprising: a support bar having opposing ends;
   means for securing a carrying strap to said support bar;
   means extending from said opposing ends of said support bar to form spaced inwardly facing opposing sides of said attachment for receiving opposing sides of the camera therebetween; and
   means coupled to each said extending means for movement thereon laterally towards said extending means into a first operative position wherein said coupling means are engageable with the opposing sides of the camera for securing said support bar to the camera, and a second inoperative position wherein said coupling means are moved upon said extending means in a direction laterally away from said extending means and out of securing relation with the camera.

10. An attachment as defined in claim 9 further comprising:
    means for resiliently biasing said coupling means from said second position into said first position; and means on said biasing means for latching said biasing means to said coupling means thereby holding said biasing means to said coupling means during movement of said coupling means between said first and second positions.

11. An attachment as defined in claim 10 wherein said coupling means includes means for manually moving said coupling means away from said first position to said second position.

12. An attachment as defined in claim 10 wherein said coupling means further includes means for receiving said latching means therein, said receiving means cooperating with said biasing means to secure said coupling means upon said extending means.

* * * * *